July 25, 1961        D. D. NYE, JR        2,993,370
FORCE TO PROPORTIONAL MOVEMENT TRANSDUCER
Filed June 3, 1958
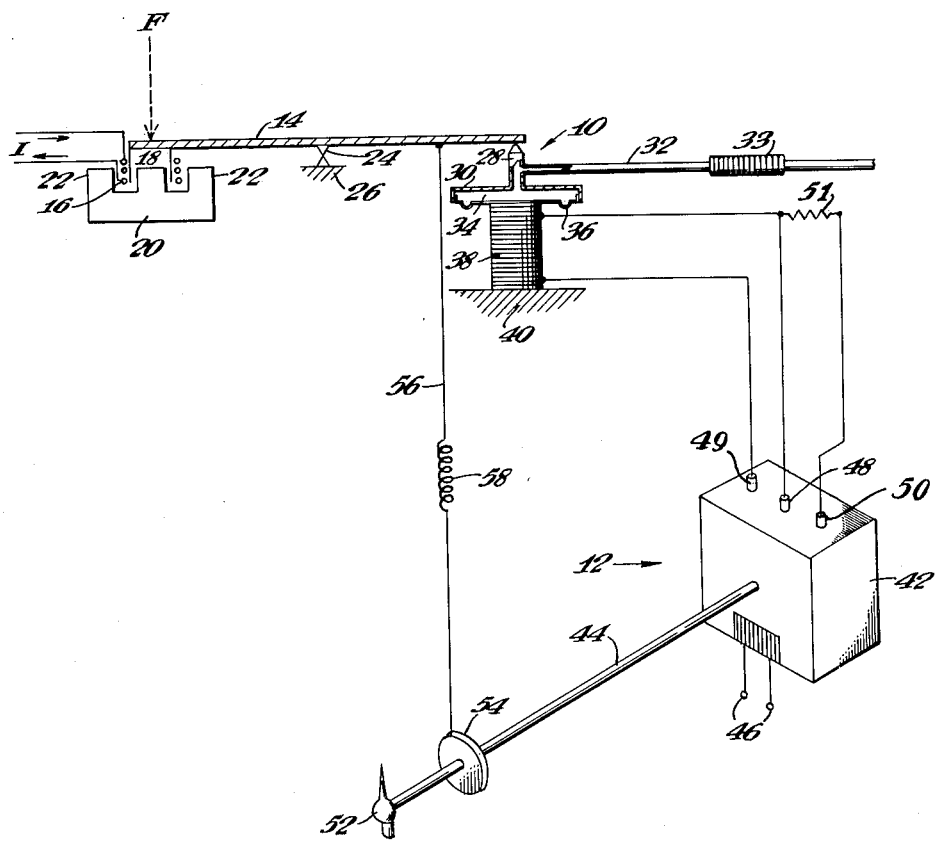

United States Patent Office 2,993,370
Patented July 25, 1961

2,993,370
FORCE TO PROPORTIONAL MOVEMENT TRANSDUCER
Dudley D. Nye, Jr., Jenkintown, Pa., assignor to Robertshaw-Fulton Controls Company, Richmond, Va., a corporation of Delaware
Filed June 3, 1958, Ser. No. 739,572
2 Claims. (Cl. 73—141)

This invention relates generally to transducers and more particularly to transducers for converting variable direct currents or variable forces representing temperatures, fluid flows, and pressures into proportional mechanical movements which may be utilized in indicating, measuring, or recording devices.

In some apparatus of this general character, it has been customary to apply a force indicative of the condition to be measured, recorded and/or controlled to a balanceable deflection beam for purposes of converting the condition into a deflection or displacement of the beam. This deflection of the beam is in turn sensed and appropriately applied to an electronic circuit and there transduced into an electrical signal which may be proportional to the original force and consequently to the condition to be measured. The electrical signal thus derived is then usually applied to a solenoid for moving same to rebalance the beam and/or position an indicator or recorder means.

In other apparatus of this character, direct currents indicative of conditions to be measured, recorded, and/or controlled are applied directly to electronic circuitry without utilizing a deflection beam and therein converted to alternating currents which may be proportional to the original D.C. currents. These alternating currents are then usually amplified in additional electronic circuitry and then applied to a motor for producing an equal and opposite direct current to "buck" the original direct currents and/or also to simultaneously move an indicator or recorder means.

There are inherent disadvantages to these prior systems and more noticeably in the use of electronic circuitry for either sensing the displacement of a movable member in response to the condition to be measured or for converting direct currents to proportional alternating currents. It is, therefore, an object of this invention to eliminate the use of such circuitry in a force-to-movement transducer thereby reducing maintenance costs and down time.

Another object of this invention is to amplify minute variations in a variable into proportional mechanical movements which can be utilized in indicating or recording devices.

A further object of this invention is to convert minute variations in a variable into proportional rotary movement.

The present invention utilizes a balanceable deflection beam to which the variable to be measured or recorded is applied in the form of a force to cause deflection or movement of one end of the beam. A stationary nozzle is positioned adjacent to the other end of the beam so as to vary the pressure in a pneumatic system in accordance with the deflection of the beam. The change in pressure of the pneumatic system is adapted to proportionately vary the resistance of a pressure sensitive resistance element connected in a circuit for controlling movement of an electro-magnetic means. The electromagnetic means is operatively connected to the beam and to an indicating or recording mechanism so that upon movement thereof in response to resitance change of the pressure sensitive resistance element, indication or recordation of the change in the variable will be made and a force will be exerted upon the beam for balancing the initial force of the condition to be measured.

These and other objects and advantages will become apparent from the following specification taken in connection with the accompanying drawing which is a schematic view of the improved transducer.

Referring to the drawing, the transducer comprises a pneumatic amplifier indicated generally by the reference numeral 10 and an indicating and rebalancing circuit indicated generally by the reference numeral 12.

The pneumatic amplifier 10 of the present invention includes a control lever or beam 14 which is adapted to receive a force F adjacent to one end thereof representative of a condition to be measured and/or recorded. This force F may be exerted by a spring bellows, Bourdon tube or diaphragm, the expansion and contraction of which is indicative of a pressure differential, pressure change, temperature, and the like.

The force F may further be exerted by an input current and, to this end, means are provided in the form of a coil 16 adapted to be connected to an input current I and wound around a hollow cylindrical conducting form 18 secured adjacent to one end of lever 14. The coil 16 and the form 18 are adapted to be received in the interior of a magnetic assembly 20, having core pieces 22, for traversing the magnetic flux lines between the core pieces 22 thereby causing movement of the coil 16 and form 18 when a change of current is induced in the coil 16.

The coil 16 and the magnetic assembly 20 may be arranged so that upon a current flow through the coil 16 in the direction shown on the drawing, coil 16 will become an electromagnet having a polarity opposite to that of the magnetic assembly 20 so as to produce a force of attraction, the intensity of which is proportional to the current in the coil 16. In this event, the current in the coil 16 will cause downward movement of the coil 16 and the form 18.

The lever 14 is pivoted at a central point on a cross-flexure member 24 which is mounted on a support 26. The other end of the lever 14 is located in flow-controlling association with the nozzle 28 of a pneumatic sensing device, a cup-shaped wall portion of which is indicated by the reference numeral 30. The nozzle 28 has a conduit 32 leading thereto for supplying a pneumatic flow thereto from a suitable pneumatic source (not shown) and conduit 32 is shown with a restriction 33 positioned between the nozzle 28 and the pneumatic source. It will be apparent that as the lever 14 is rotated in a clockwise direction about cross-flexure 24, the same will approach the tip of the nozzle 28 to restrict the flow therethrough and, consequently, increase the fluid pressure within the conduit 32. Conversely, a counter-clockwise rotation of the lever 14 about cross-flexure 24 will increase the gap between the tip of nozzle 28 and lever 14 to decrease the fluid pressure in the conduit 32.

Nozzle 28 communicates with an expansible chamber 34 defined by the wall portion 30 and a diaphragm 36 is secured across the open end of wall portion 30 to define a movable wall or force actuator for the chamber 34. A pressure sensitive resistance element which may take the form of a carbon pile 38 is operatively disposed between the diaphragm 36 and a support member 40 and is compressible in accordance with pressure variations in the chamber 34. Suitable means (not shown) may be provided to prevent compression of carbon pile 38 by the initial operating pressure in chamber 34 and for adjusting the nozzle pressure required to completely compress carbon pile 38.

The indicating and rebalancing circuit 12 of the present invention includes a suitable electromagnetic device for producing linear or rotary movement and is shown in the form of a two-phase shaded pole motor 42 which may include speed reducing means in the form of a step down gear train (not shown) and a rotating shaft member 44.

Motor 42 is provided with field terminals 46 to which a field reference potential is applied and the shaded pole control windings thereof are connected to the common, clockwise and counterclockwise terminals thereof which are indicated by reference numerals 48, 49, and 50, respectively. Impedance means are connected to the shaded pole control windings of motor 42 and comprise a resistor 51, of fixed value, connected in shunt with terminals 48 and 50 and a carbon pile resistance element connected in shunt with terminals 48, 49.

The carbon pile resistance element 38 and the resistor 51 may be arranged so that when they are equal in value, the shaft 44 will be in a condition of rest or zero velocity and will not rotate. Upon change in resistance of the carbon pile 38, which causes a condition of unbalance in the shaded pole windings of motor 42, the shaft 44 will rotate with an angular velocity which is proportional to the value of resistance of the carbon pile 38. In this event, when the resistance value of the carbon pile 38 is greater than the value of resistor 51, the shaft 44 will rotate in a counterclockwise direction and, conversely, when the resistance value of carbon pile 38 is less than the value of resistor 51, the shaft 44 will rotate in a clockwise direction.

Rotation of shaft 44 can be utilized to indicate or record the variations in the force F and, to this end, a pointer 52 is shown secured to the free end of shaft 44. Pointer 52 may be adapted to cooperate with a suitably calibrated dial for an indicating instrument or may be in the form of a pen arm for a recorder cooperable with a suitably calibrated recorder dial or chart.

A feedback arrangement is utilized to mechanically balance the beam 14 and takes the form of a pulley 54 secured intermediate the ends of shaft 44 for rotation therewith. Pulley 54 has an operable connection to beam 14, adjacent the end thereof cooperable with nozzle 28, in the form of a suitable wire or rope 56 having a calibration spring 58 integrated therewith intermediate its ends. One end of wire 56 is secured to beam 14 and the other end thereof is secured to pulley 54 and is cooperable therewith in a manner so that upon counterclockwise rotation of shaft 44, a portion of the length of wire 56 will be wound upon the pulley 54 to exert a force on beam 14 in the downward direction. Clockwise rotation of shaft 44 will unwind a portion of the length of wire 56 from the pulley 54 to relieve the force exerted by wire 56 on the beam 14.

With the force F applied to lever 14 in the direction shown on the drawing, as by flow of current in the direction shown on the drawing, a moment of force will cause rotation of lever 14 in the counterclockwise direction about cross-flexure 24. When a moment of force is applied to lever 14 by wire 56, in an amount which is equal and opposite to the moment of force exerted by the force F, the lever 14 will be in a condition of balance. In this balanced condition, the resistance of carbon pile 38 will be of a value equal to that of resistor 51 and the shaft 44 of motor 42 will be in a condition of rest or zero angular velocity. A source of pneumatic pressure will furnish a steady flow of fluid to the nozzle 28 so that the apparatus is in a condition to indicate a change in the force F due to a change in the value of the current I.

When the force F is increased due to an increase in the current I, the lever 14 will rotate in a counterclockwise direction about cross-flexure 24 to increase the gap between the lever 14 and the nozzle 28 and thus decrease the pneumatic pressure in the conduit 32 as previously explained.

This decrease in pneumatic pressure in the conduit 32 is conducted to the chamber 34 where it is applied to the diaphragm 36. Since the pneumatic pressure in chamber 34 is decreased, the diaphragm 36 will move inwardly causing a decrease in the compressive force applied to carbon pile 38 and accordingly an increase in the effective resistance thereof and a condition of unbalance in the shaded pole windings of motor 42. Rotation of the shaft 44 in a counterclockwise direction will result because of this unbalance, as previously explained, at an angular velocity which is proportional to the resistance value of the carbon pile 38. Counterclockwise rotation of shaft 44 causes wire 56 to exert a greater force on beam 14 in a downward direction in opposition to the increase in force F applied thereto and movement of lever 14 toward the nozzle 28 increasing the pressure in chamber 34. As the pressure in chamber 34 increases, the effective resistance of carbon pile 38 decreases until the moment of force exerted by wire 56 reaches a value that is equal to the moment of force induced by the force F. At this point of balance, the resistance value of carbon pile 38 will again equal the resistance value of resistor 51 and pointer 52 will have been moved in a counterclockwise direction through an angle directly proportional to the increase in force F.

If the force F is decreased or removed, the lever 14 will be caused to rotate about cross-flexure 24 in a clockwise direction due to the moment of force exerted on the lever 14 by the wire 56. The gap between the nozzle 28 and the lever 14 will decrease and the pressure within the conduit 32 in the chamber 34 will consequently increase moving the diaphragm 36 downwardly to increase the compressive force on carbon pile 38. The resistance of carbon pile 38 will decrease in response to the increase in compressive force causing an unbalance in the shaded pole windings of motor 42 and a resultant rotation of shaft 44 in a clockwise direction, as previously explained, with an angular velocity which is proportional to the resistance value of the carbon pile 38. Clockwise rotation of shaft 44 reduces the moment of force exerted by wire 56 on lever 14, thus increasing the gap between nozzle 28 and lever 14 and accordingly decreasing the pressure in chamber 34. The effective resistance of carbon pile 38 will increase until the moment of force exerted by wire 56 reaches a value which is equal to the moment of force exerted by the reduced force F, thus restating a condition of balance to lever 14 and to the shaded pole windings of motor 42. At the condition of balance, pointer 52 will have been moved in a clockwise direction through an angle directly proportional to the force F.

Although the invention has been shown and described with a motor to drive an indicating or recording means and to rebalance the beam, it will be obvious to those skilled in the art that the device of this invention could be practiced with a solenoid which would have its actuating current determined by variations in the resistance of the carbon pile 38. In this regard, it will be noted that when the motor 42 is utilized, the resistance value of carbon pile 38 is equal to that of resistance 51 when the beam is in a condition of balance. When a solenoid is utilized, the resistance value of the carbon pile 38 will determine the position of the solenoid output and accordingly, equilibrium of the beam will be reached without the beam being perfectly balanced. This, however, is not detrimental to the overall operation of the device for if the nozzle is sensitive enough the degree of unbalance is negligible.

Only one embodiment of the invention has been shown and described herein, and inasmuch as this invention is subject to many variations, modifications and reversal of parts, it is intended that all matter contained in the above description of the embodiment shown and described shall be interpreted as illustrative and not in a limiting sense.

I claim:

1. In electro-pneumatic apparatus for indicating the magnitude of a variable force, the combination comprising a pneumatic pressure supply, means defining a contractible and expansible chamber communicating with said supply and having an end wall movable in response to pressure variations within said chamber, a nozzle communicating with said chamber, a pivoted lever having one end in flow controlling relationship with said nozzle and an opposite end being movable in response to a deviation in the variable force, said one end being moved relative to said nozzle in an amount proportional to the deviation in the variable force and causing a pressure variation within said chamber, electric motor means including a rotatable shaft and a source of electrical power for energizing said motor means, means on said shaft for indicating an angular displacement thereof, an operative connection between said shaft and said lever and exerting a force on said lever in proportion to the angular displacement of said shaft, a pressure sensitive resistance element operatively connected to said end wall whereby pressure variations in said chamber cause proportionate variations in value of said resistance element, an electrical connecting means between said resistance element and said motor means for causing rotation of said shaft in proportion to resistance variations in said resistance element and fixed value resistance means electrically connected between said resistance element and said motor means whereby the direction of rotation of said shaft is determined by positive and negative variations in the value of said resistance element from the fixed value of said resistance means.

2. The combination recited in claim 1 wherein current input means is operatively connected to the said opposite end of said lever for furnishing the variable force for movement thereof in response to variations in current input.

References Cited in the file of this patent

UNITED STATES PATENTS

| | | |
|---|---|---|
| 1,729,320 | Anderson | Sept. 24, 1929 |
| 1,878,554 | Townshend et al. | Sept. 20, 1932 |
| 2,408,685 | Rosenberger | Oct. 1, 1946 |
| 2,670,464 | Wuensch et al. | Feb. 23, 1954 |
| 2,765,415 | Ehret | Oct. 2, 1956 |